Patented Sept. 9, 1930

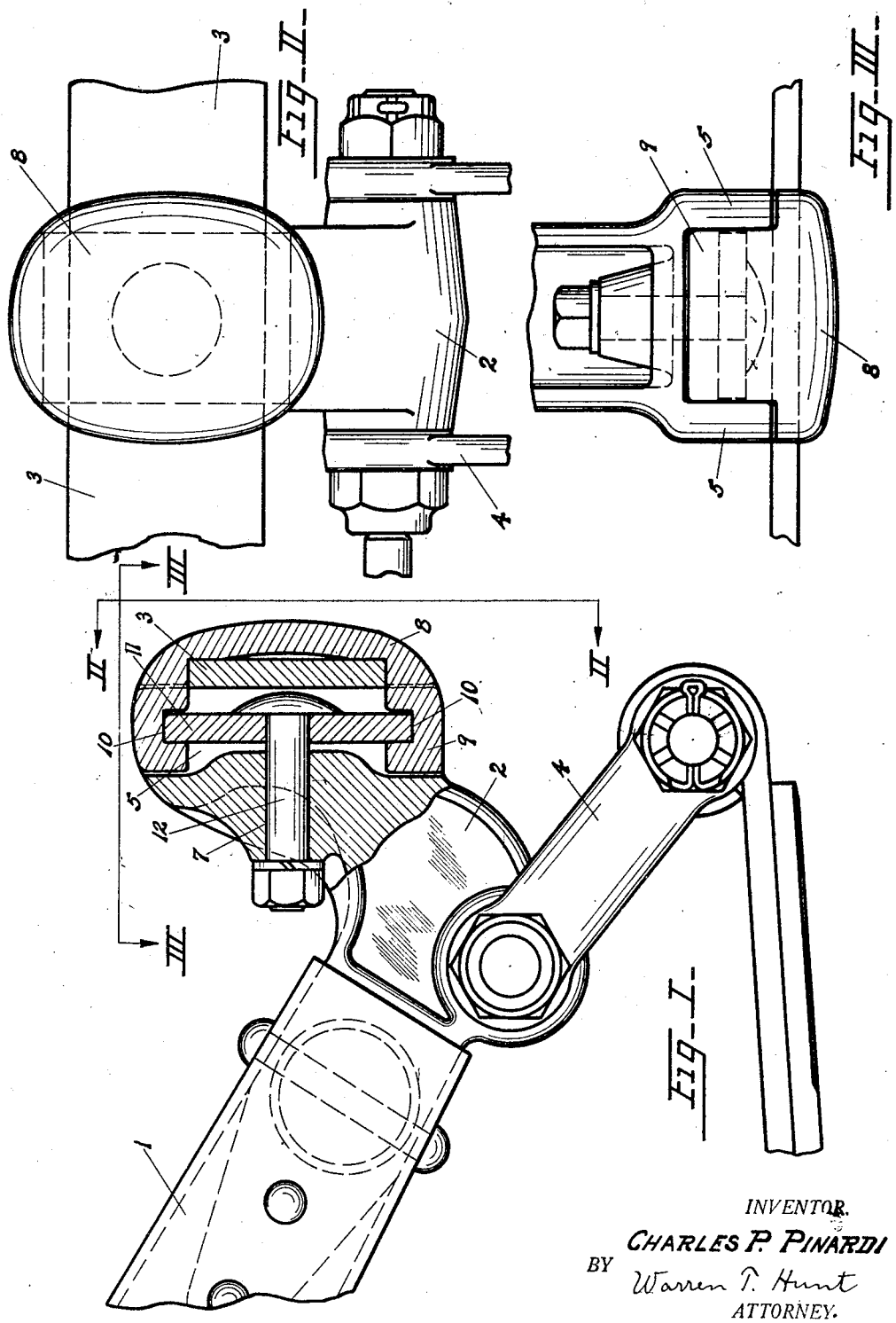

1,775,139

UNITED STATES PATENT OFFICE

CHARLES P. PINARDI, OF TOLEDO, OHIO, ASSIGNOR TO THE WILLYS-OVERLAND COMPANY, OF TOLEDO, OHIO, A CORPORATION OF OHIO

BUMPER BRACKET

Application filed May 31, 1929. Serial No. 367,182.

This invention relates to supports for bumper bars.

One object of the invention is to provide a supporting element for a bumper bar in which only one bolt is used to connect the supporting element to the bracket.

A further object is to provide a support of this type in which the bolt is completely housed within co-operating parts of the supporting element and the bracket.

In the accompanying drawings, in which like reference numerals designate like parts, throughout the several views:

Figure I is a side elevation of the improved bracket, parts being broken away to more clearly show the construction.

Fig. II is an elevation looking in the direction of the arrows II—II of Figure I, and Fig. III is a plan view, looking in the direction of the arrows III—III of Figure I.

In the drawings, 1 represents the side frame extension of an automobile. Secured to the frame end 1 is a bracket 2, which serves to support the bumper bar 3 and also the upper end of the spring shackle 4. The upper portion of the bracket is provided with vertical outwardly extending ears 5 and an aperture 7. A U-shaped member 8 fits over the bumper bar 3. The arms 9 of the U-shaped member are provided with grooves 10. A plate 11 carrying an ordinary carriage bolt 12 slides in the grooves 10 behind the bumper bar 3. The bolt 12 passes through the aperture 7 in the bracket and is drawn up so that the arms 9 of the U-shaped member pass between the ears 5, and the bumper bar is clamped between the ends of the ears 5 and the U-shaped member. The plate 11 is thus housed and securely held in position by the arms 9 and the ears 5. It will be obvious that the U-shaped member 8 may be given any desired configuration to serve as an ornament.

While I have shown a specific embodiment of my invention, it is to be understood that this showing and description are illustrative only and that I do not regard the invention as limited to the details of construction illustrated and described, except in so far as I have included such limitations within the following claims.

I claim:

1. A device of the class described comprising a bracket adapted to be attached to a vehicle, a U-shaped member adapted to fit over a bumper bar, a plate removably secured to said U-shaped member, and means for securing said plate to said bracket in such a manner that said bracket prevents separation of said plate and said U-shaped member.

2. A device of the class described, comprising a bracket adapted to be attached to a vehicle, a U-shaped member adapted to fit over a bumper bar, a plate slidably engaged with said U-shaped member, and means for securing said plate to said bracket in such a manner that said bracket prevents disengagement of said plate from said U-shaped member.

3. A device of the class described comprising a bracket adapted to be attached to a vehicle and having projecting ears, a U-shaped member adapted to fit over a bumper bar and having grooved extensions fitting between said ears, a plate adapted to interfit with the grooves in said extensions, and means for securing said plate to said bracket in such a manner that said ears prevent relative sliding movement between said plate and said U-shaped member.

4. The combination with a vehicle frame and a bumper therefor, of a clamp comprising a bracket secured to the frame, a cap having a recess adapted to receive the bumper, said cap having grooves in spaced relation to the rear wall of the recess, and means engaging said grooves and said bracket for forcing the cap toward the bracket and clamping the bumper therebetween.

5. The combination with a vehicle frame and a bumper therefor, of a clamp comprising a bracket secured to the frame, a cap engaging the front side of the bumper, and means comprising a threaded member cooperating with said cap and bracket for drawing them together, said means being disposed between said bumper and said bracket.

6. The combination with a vehicle frame and a bumper therefor of a clamp comprising a bifurcated bracket secured to the frame, a cap having a recess for the bumper and a projection between the bracket bifurcations, said projection having a groove therein, and means slidably engaging said groove and cooperative with said bracket for drawing the cap and bracket together.

7. A clamp for a vehicle bumper, comprising a bifurcated bracket, a cap having a projection between the bracket bifurcations, a member laterally slidable in the cap projection and means for drawing the cap projection within the bracket bifurcations, whereby displacement of the laterally slidable member is prevented.

In testimony whereof, I affix my signature.

CHARLES P. PINARDI.